July 18, 1933.　　　V. J. BURNELLI　　　1,918,687
AIRCRAFT
Original Filed Jan. 28, 1928　　3 Sheets-Sheet 1
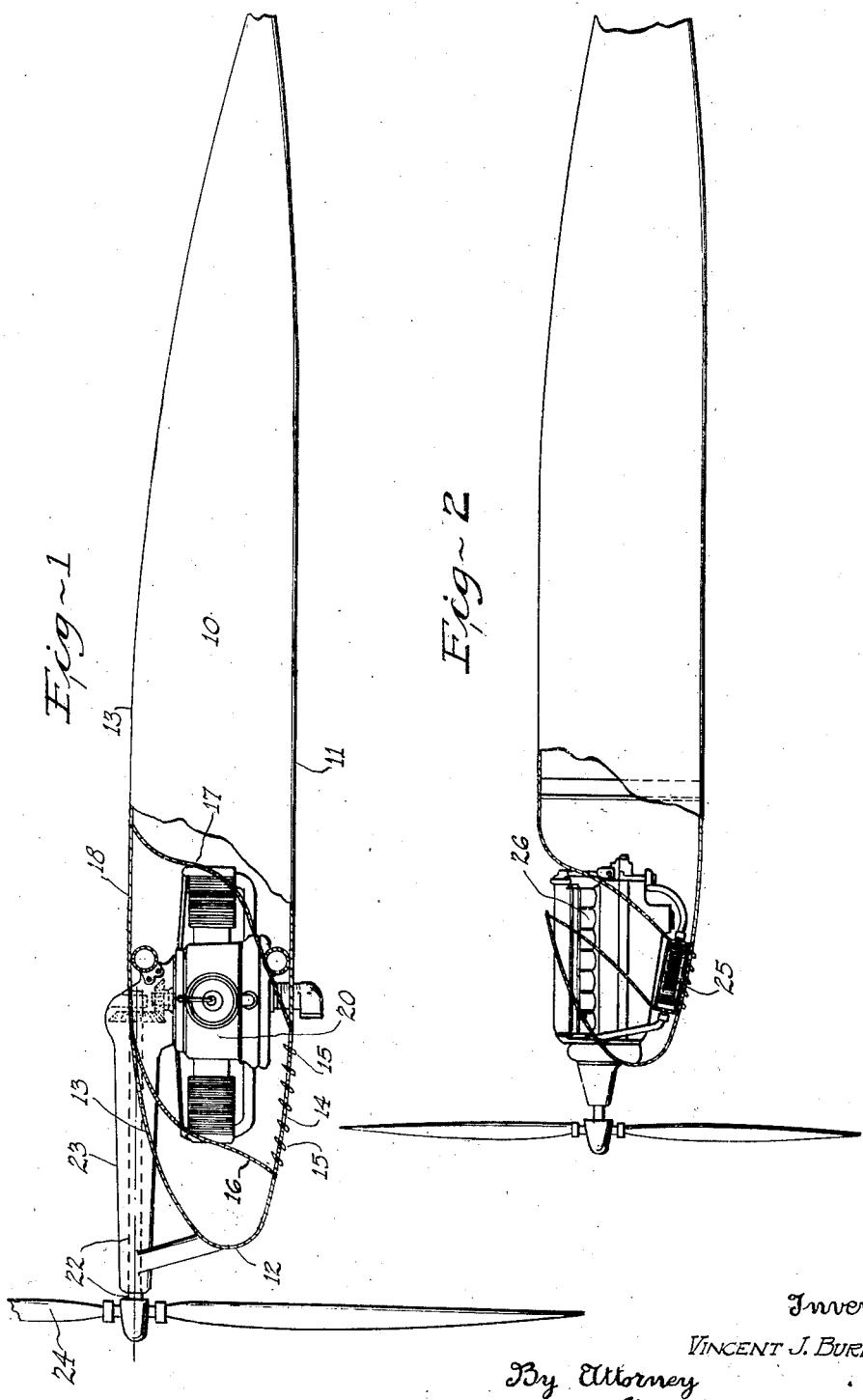
Inventor
VINCENT J. BURNELLI
By Attorney
Frank H. Borden

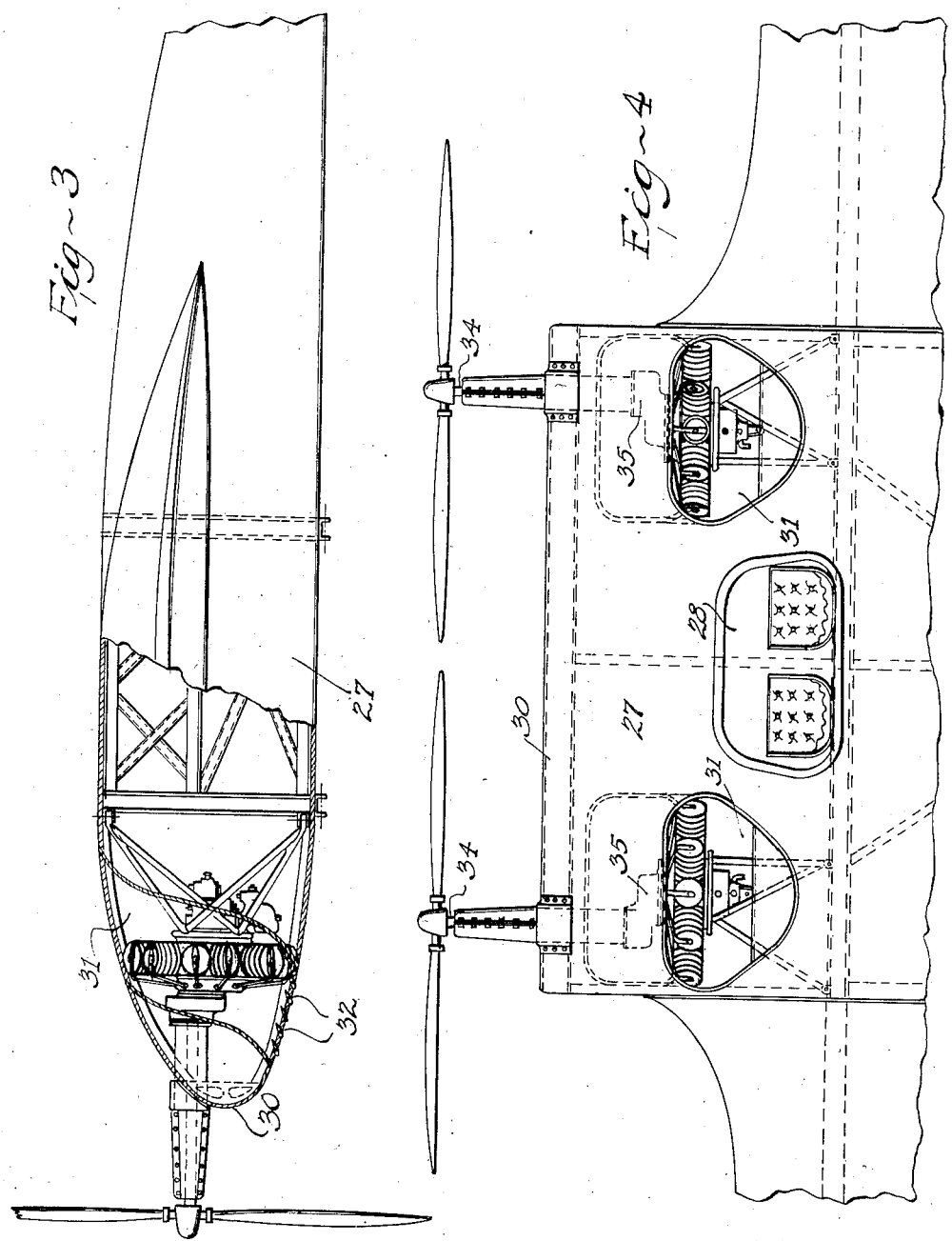

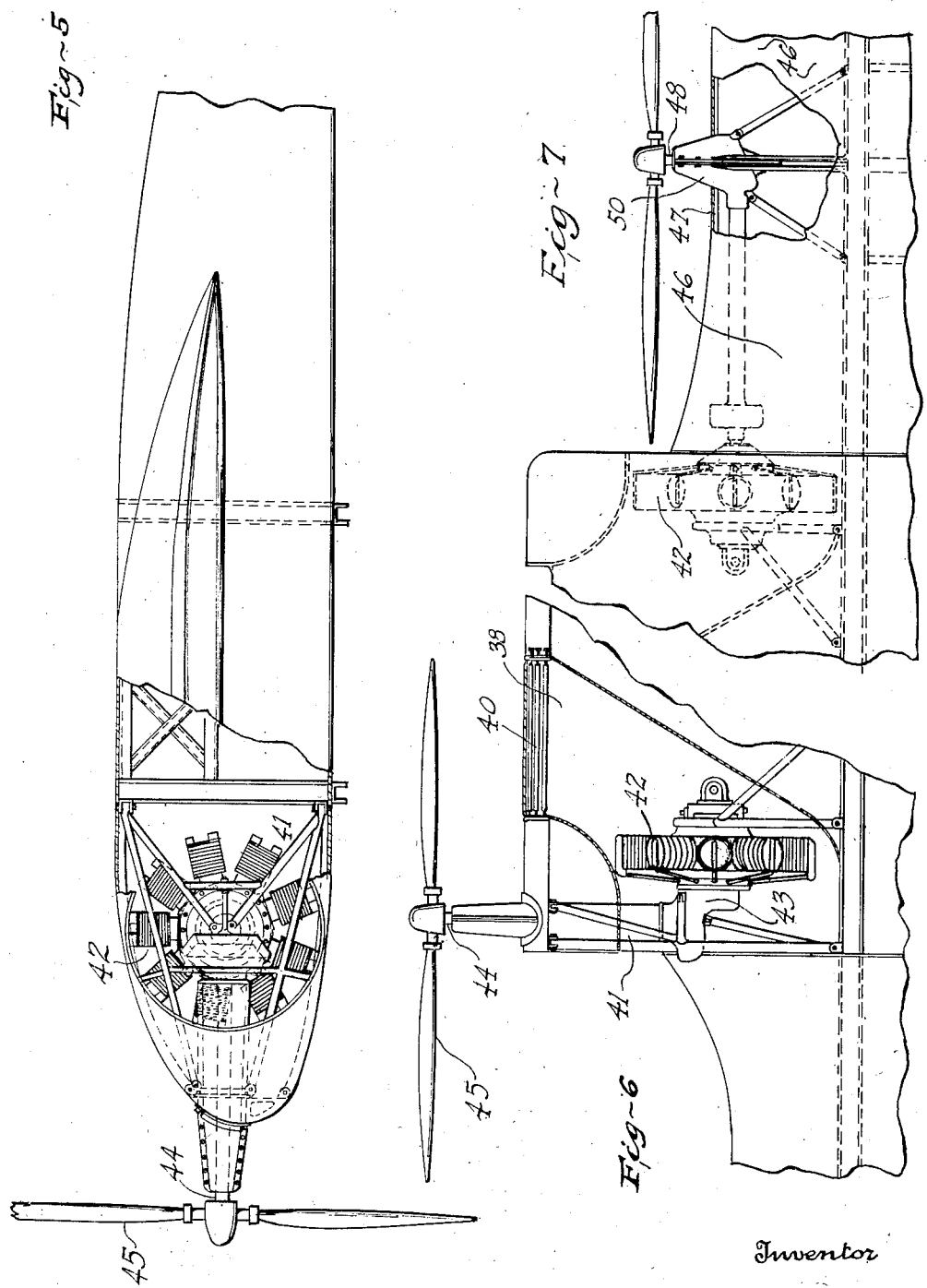

Patented July 18, 1933

1,918,687

UNITED STATES PATENT OFFICE

VINCENT J. BURNELLI, OF NEW YORK, N. Y., ASSIGNOR, BY MESNE ASSIGNMENTS, TO BURNELLI AIRCRAFT, LTD., OF DOVER, DELAWARE, A CORPORATION OF DELAWARE

AIRCRAFT

Application filed January 28, 1928, Serial No. 250,234. Renewed December 7, 1932.

This invention relates to aircraft, and more particularly to the advantageous disposition of the cooling elements of the power sources thereof.

Among the objects of the invention are; to reduce the parasite resistance of aircraft; to transform parasite resistance to a pressure transverse to the line of flight and thus eliminate drag; to so dispose the power sources of aircraft that with an increase of efficiency there is an increase in accessibility for inspections and repairs in flight; to improve the construction of airplanes; to provide a slot in an airfoil so arranged as to provide an airstream for cooling the power source of the airfoil; to provide an improved mounting for aircraft power sources so that they are arranged closer to the center of gravity than has heretofore been possible; to dispose a radial engine within an aircraft body, as distinct from the customary external mounting thereof; to provide improved gearing for airplane power sources whereby a plurality of propellers may be driven efficiently from a plurality of closely grouped power sources; to improve the assembly of power sources, shafts and propellers whereby larger propellers may be utilized; to provide means for varying the cooling airstream on radial aircooled motors; to provide in an airplane a plurality of power sources disposed within the boundaries of a body so as to provide an entering edge of true airfoil contour of minimum parasite resistance; to provide an airfoil with a slot through which a vertical air stream may pass subject to regulation by the pilot to vary the effective lift of the airfoil, and which vertical airstream is utilized as the medium for cooling an aircraft engine; and many other objects and advantages as will be more apparent as the description proceeds.

In the accompanying drawings,

Fig. 1 represents a side elevation, partially in section, disclosing an airfoil or body having a vertical slot in which a radial aircooled engine is disposed in a horizontal plane, Fig. 2 represents a similar view of an airfoil or body having a vertical slot in which the radiator of a water-cooled engine is disposed, Fig. 3 represents a vertical section, partially in elevation, of an airfoil or body having a slot in which the radial engine is disposed in a vertical plane, Fig. 4 represents a top plan of a portion of a body of an airplane disclosing the formation of the vertical slots with engines disposed therein as shown in Fig. 3, with gearing arranged so that the propeller shaft is off-set from the engine shaft to permit the use of larger propellers, Fig. 5 represents a side elevation partially in section, of an airfoil or body, having a duct extending from the entering edge thereof to the side of the body, within which an engine is disposed vertically but with its axis transverse to the line of flight, Fig. 6 represents a fragmentary top plan of a body or airfoil utilizing the duct shown in Fig. 5, but with the propeller shaft extending through the entering edge thereof, Fig. 7 represents a fragmentary top plan of a body and associated airfoil, disclosing the disposition of an engine in the body, with the propeller shaft extending from the airfoil, connected by a shaft and a single set of gears to the engine, The use of radial, aircooled engines in airplanes has become common, but despite the advantages of decreased weight and possibly more certain performance, there have been serious disadvantages militating against universal use. As it has heretofore been necessary to mount them externally on the nose of the fuselage, or other support, they have been quite inaccessible during flight, thus preventing repairs; they have been inefficiently cooled, being too cool at high speeds and too warm at slow speeds; it was customary to drive the propeller shaft directly from the engine shaft, with a loss of propeller efficiency at certain engine speeds, and in the case of multiple engined airplanes with a necessary reduction in the size of the propellers, at a loss of efficiency; and further, the power used to overcome the parasite resistance of this large, turbulence creating element, represented a direct unpaying drag as a further item of inefficiency. In the invention disclosed herein these several disadvantages are overcome, as are others.

Referring now to the drawings, and particularly to Fig. 1, an airfoil section 10, having a lower surface 11, entering edge 12, upper section 13, is disclosed. It will be understood that the airfoil section in question may be a wing, a fuselage, a nacelle, or other element in an airplane, whether arranged for flight from land or water, or both, and that it need not be completely of airfoil contour. In case the element 10 should happen to be a fuselage, it is contemplated merely that an entering edge of airfoil contour be provided, regardless of the contour or construction of the remainder thereof. In the section 10, as far from the entering edge as may be found desirable or expedient, an aperture or port 14 is provided in the lower surface 11, having a series of shutters 15 under the control of the pilot, in any desired manner, (not shown). The port 14 opens upon a substantially vertical slot defined by a front internal surface 16, and a rear internal surface 17, and appropriate side internal surfaces if these are necessary. It will be understood that the term slot is intended to include a top to bottom opening of any lateral width desired, and preferably in formation and operation such an opening that will impart enhanced lift to the section in which it is formed, by the passage therethrough of a substantially vertical air stream from the lower surface to the upper surface, in the well known slot action developed, among others, by Handly Page. The slot opens at the upper surface 13 in a port 18. It will further be understood that the internal surfaces, either front or rear, according to the direction from which the main body of the section 10 extends, as the slot may be located at any desired point in the section, may be removable, in whole or part, so as to form doors or windows permitting access to the interior of the slot. This will be of particular advantage if the section was of such dimensions as to permit an operator to move through it, as will be quite obvious in the case of a fuselage, or of a thick wing.

A motor or engine 20, preferably of the radial air-cooled type, is mounted horizontally in the section 10, in the slot, connected by gearing to propeller shaft 22, projecting above the entering edge 12 through a braced shaft hanger 23. A propeller 24 is mounted on the propeller shaft. It will be observed that the disclosure in Fig. 1, is preferably a wing mount for a motor, in which the motor is out of the air stream so that there is no parasite resistance attached thereto except possibly the minute and greatly reduced resistance of the hanger for the propeller shaft. The motor is well back and down towards the center of gravity of the airplane, and using a single set of gears effects an efficient and thoroughly practicable installation. The cooling of the motor, and this explanation attaches to all of the several forms of slots and motor mounting disclosed, is quite simple. The motor, being disposed in the slot is out of the airstream, but the passage of the section 10 through the air, and the movement of the propeller relative to the section provides an airstream divided into two currents, respectively above and below the section, effecting, as is well known, pressure on the lower surface of the section, and rarefaction on the upper surface. The shutters 15 may be manipulated by the pilot so that a portion of the pressure on the lower surface is relieved by passage past the shutters into the slot through which it is projected to meet the rearwardly directed current effecting the rarefaction on the upper surface and merging therewith to cause the joint airstream to be projected higher from the upper surface of the section with an enhancement of the rarefaction. Of course as the upward current passes through the slot it contacts with the motor 20, conducting the heat away from the cooling fins thereof, as will be clear. At high speeds with a possible exaggerated airstream through the slot, and too rapid cooling of the motor, the shutters may be manipulated to reduce the flow.

In the device shown in Fig. 2, the parts are the same except that instead of the air-cooled motor disposed in the slot, the radiator 25, of a water cooled motor 26 is disposed in the path of the upwardly flowing airstream. It will be clear that the motor 26 may be disposed at any point desired relatively to the radiator, and that such gearing as may be necessary for remote positioning of the motor relative the propeller and slot may be availed of.

In Figs. 3 and 4, a multiple-engined airplane is disclosed, in which a section, preferably a fuselage 27, having a centrally disposed cockpit 28, back somewhat from the air-foil contoured entering edge, has a pair of upwardly extending slots 31, the slots being controlled by shutters 32. In each slot 31 an aircooled engine, (preferably) 33, is disposed with its axis parallel with the longitudinal axis of the airplane. It will be clear that the axis of the engine in each slot may be in alignment with the axis of the propeller shaft 34 if desired. It is preferred to use off-set gearing indicated by the housing 35, whereby the propeller shafts may be projected through the entering edge 30 close to the side edges thereof, without also causing the motors to project beyond the side edges, and moreover so that with a minimum space or clearance between the substantially parallel motor shafts, there is a maximum space or clearance between the propeller shafts, enabling the use of longer propellers without danger of conflict between them.

It will also be obvious that the mounting of the motor in a vertical plane transverse to the airplane as shown in these figures is not confined to multiple motored airplanes, but it is within contemplation to utilize the mounting in a single motored ship. The operation of the cooling airstream and its control are practically the same as before and need not be entered into at this time, as it would be mere repetition.

The form of the invention disclosed in Figs. 5, 6, and 7, involves the formation in the entering edge of the airfoil section, which is disclosed as a fuselage, of a duct or port 38, controlled by shutters 40, extending rearwardly in the nose of the section and outwardly to an opening 41 formed in the side of the section. A motor 42 is mounted in the duct in a vertical plane parallel with the longitudinal axis of the airplane or section, connected with gearing 43 to a propeller shaft 44 carrying propeller shaft 45. It is pointed out that an airstream entering the duct under regulation by the pilot sweeps by the motor 42 cooling it as desired without imposing an appreciable drag on the section.

In Fig. 7 a modification is disclosed, wherein the motor 42 mounted in the duct 38, in the body, or section, is disposed in a fuselage, from which an airfoil 46 extends, having an entering edge 47, from which a propeller shaft 48 extends, connected by gearing 50 to the motor 42. This indicates one possible construction enabling the use of propellers on the wings of an airplane without so much gearing, etc. as to be impracticable, yet with the motor disposed in the fuselage where it can be given attention during flight. It is pointed out that this assembly of motor, shafting and gearing connecting a propeller on the wing with the motor in the fuselage need not be necessarily identified with the duct 38 of Figs. 5, 6, and 7, but may equally well be utilized in connection with the slot formation of the other figures.

I claim:

In an airplane, a fuselage of appreciable width having an entering edge of airfoil contour, a pair of vertically extending slots in the fuselage, a pair of radial air-cooled engines disposed respectively in the slots, a pair of propeller shafts projecting from the entering edge forming the only irregularities in the surface thereof, the axes of the engines and the propeller shafts being in substantial parallelism, but with the propeller shafts spaced a greater distance apart than the axes of the engines, and means connecting the respective engines and shafts in driving relation.

VINCENT J. BURNELLI.